US006778490B1

(12) United States Patent
Achilles et al.

(10) Patent No.: US 6,778,490 B1
(45) Date of Patent: Aug. 17, 2004

(54) METHOD AND APPARATUS FOR A FAULT TOLERANT ROUTER ARCHITECTURE

(75) Inventors: Heather Achilles, Hudson, NH (US); Terry Pearson, Hollis, NH (US); Paul Gallo, Newton, MA (US); Kevin Klapper, Sudbury, MA (US); Dan Sullivan, Hopkinton, MA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/314,569

(22) Filed: May 19, 1999

Related U.S. Application Data

(60) Provisional application No. 60/086,078, filed on May 20, 1998.

(51) Int. Cl.[7] .............................................. H04L 12/28
(52) U.S. Cl. ........................ 370/217; 370/219; 370/221; 370/225
(58) Field of Search ................................ 370/351, 389, 370/395.1, 395.5, 395.51, 395.52, 395.6, 395.7, 395.71, 360, 464–468, 216, 217, 218–221, 225, 352–356, 391, 401, 402, 912, 914; 359/109, 115, 142, 147

(56) References Cited

U.S. PATENT DOCUMENTS

| | | | |
|---|---|---|---|
| 5,126,889 A | 6/1992 | Walden |
| 5,130,984 A | 7/1992 | Cisneros |
| 5,367,521 A | 11/1994 | Sanchez et al. |
| 5,533,198 A | 7/1996 | Thorson |
| 5,602,988 A | 2/1997 | Haulin |
| 5,689,646 A | 11/1997 | Thorson |
| 5,781,715 A | 7/1998 | Sheu |
| 5,848,227 A | 12/1998 | Sheu |
| 5,991,829 A | 11/1999 | Giorgio et al. |
| 6,041,036 A | 3/2000 | Baek et al. |

Primary Examiner—William A. Luther
(74) Attorney, Agent, or Firm—Blakely Sokoloff Taylor & Zafman LLP

(57) ABSTRACT

A method, apparatus and article of manufacture for routing a data packet in a fault tolerant manner. A data packet is received from an incoming data channel and is transferred to a switching engine (SE) through an access processor engine (APE). A route for the data packet is generated using a central processor resource (CPR). The data packet is transferred from the SE to an outgoing trunk physical module (TP) using the route.

13 Claims, 3 Drawing Sheets

METHOD AND APPARATUS FOR A FAULT TOLERANT ROUTER ARCHITECTURE

CROSS-REFERENCES TO RELATED APPLICATIONS

This application claims the benefit of U.S. Provisional Application No. 60/086,078 entitled "Big Access Concentrator" filed May 20, 1998.

FIELD OF THE INVENTION

This invention relates generally to computer networks, and more particularly, to a method and apparatus for a fault tolerant router architecture.

BACKGROUND OF THE INVENTION

In the field of data routing in computer networks, an Internet service provider (ISP) user typically has much more stringent requirements than an enterprise user because the routers will be subjected to the adverse Internet routing environment in the world. There are three typical architectural requirements that such routers must support, described below.

A. Stable Operation. Although it sounds trivial, the notion of stable operation has been elusive in the ISP community, as witnessed by various Internet "brown-outs" since it's inception. One paper on Internet scaling "Scaling the Internet during the T3 NSFNET Years", C. Villamizar, Oct. 22, 1997, articulates the basic requirements which ISPs demand from their networking equipment in order to provide a stable network. In addition to forwarding performance and scaling requirements, ISPs typically expect several operational attributes, given below.

1. Stability under adverse conditions. The router must remain stable and deterministic under arbitrarily high traffic loads or a flood of routing update changes.
2. Low packet loss to stable destinations. The effects of unstable routes (flapping) should not impact a router's ability to forward traffic to stable routes.
3. Reasonable fairness and congestion control. Sufficient buffering capacity, avoidance of head-of-line blocking, advanced queueing algorithms, and sophisticated discard techniques must be provided.

B. Service Differentiation. Recently it has become clear that service providers cannot make adequate margins by offering flat-rate access and undifferentiated service. The ability to offer tiered services, and to guarantee service levels, is crucial to the economic and competitive health of ISPs. The airline industry's first-class, business-class and coach-class offerings provide a meaningful analogy for Internet service differentiation: a small number of customers are willing to pay for premium service, if it can be guaranteed. The concentrator's must enable ISPs to offer differentiated services based on multiple queues and advanced, intelligent Traffic Management features.

C. Superior Reliability. ISP routers must provide a greater level of reliability and availability than known router architectures. Part of this flows from designing with stability in mind, but providing additional fault tolerance features adds another dimension of resiliency. ISP routers should be designed without any single points of failure, and all software designs should incorporate fault isolation principles.

Therefore, there is a need for a way to route data in computer networks that provides stable operation, service differentiation, and superior reliability. Such an invention should be stable under adverse conditions, insure low packet loss to stable destinations, and provide reasonable fairness and congestion control.

SUMMARY OF THE INVENTION

The present invention provides a method, apparatus and article of manufacture for routing a data packet in a fault tolerant manner. A data packet is received from an incoming data channel and is transferred to a switching engine (SE) through an access processor engine (APE). A route for the data packet is generated using a central processor resource (CPR). The data packet is transferred from the SE to an outgoing trunk physical module (TP) using the route.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF AN EMBODIMENT OF THE PRESENT INVENTION

Figure 1:
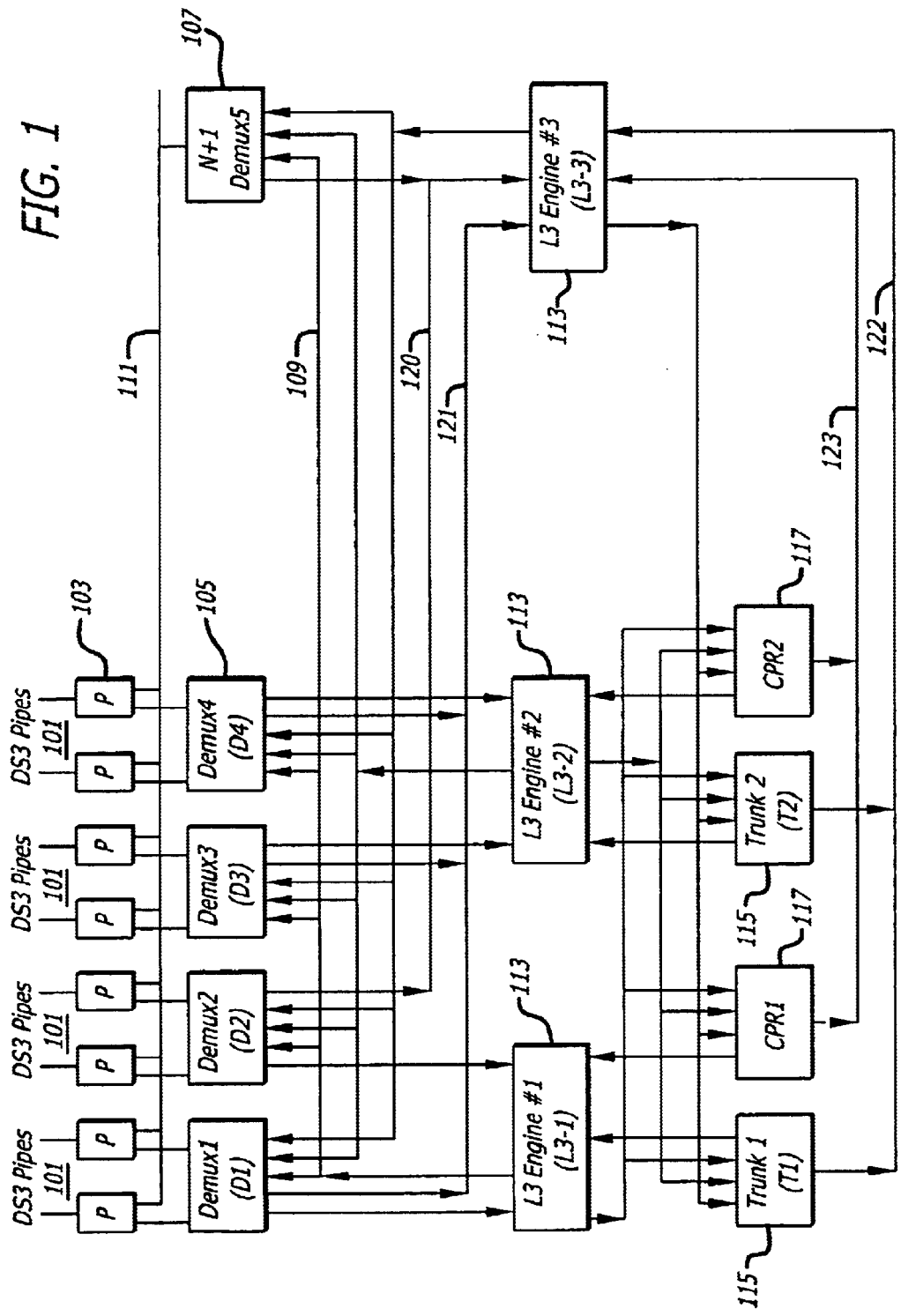
FIG. 1 is a block diagram of a fault tolerant router architecture compatible with the present invention.

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the disclosed technology. A preferred embodiment of the disclosed technology, described below, enables a remote computer system user to execute a software application on a network file server.

The disclosed technology provides a method, apparatus and article of manufacture for routing a data packet in a fault tolerant manner. A data packet is received from an incoming data channel and is transferred to a switching engine (SE) through an access processor engine (APE). A route for the data packet is generated using a central processor resource (CPR). The data packet is transferred from the SE to an outgoing trunk physical module (TP) using the route.

As shown in the figures and as described below, the disclosed technology provides a fault tolerant router architecture which allows a network router to continue to function if there is a hardware failure within the router and minimize the impact a hardware failure would have on the network as a whole. In one embodiment, the disclosed technology has 21 cards: five access processor engines (APEs) and their five associated physical cards, two trunk cards (TPs) and their associated physical cards, three Layer 3 switching engines (L3s), two central processor resources (CPRs) and their associated physical cards. The APEs are typically incorporated on the network access side of the disclosed device, and contain logic for channelizing/ dechannelizing incoming connections such as T1 lines. Route determination is typically determined by the CPRs. The L3s typically perform Layer 3 forwarding, and the TPs are typically used as the interface to the internet service provider (ISP) network.

As shown in the figures and described below, the disclosed technology is configured to support N+1 redundancy in the APEs and the L3s. In the diagram, the L3s are labeled "demux".

The APEs are N+1 redundant. In one embodiment, there are a maximum of five APEs in the system: four APEs support the physical interconnect and the fifth provides the N+1 redundancy. The fifth APE connects to all of the APE physical cards via a bus and can take over for any of the APEs if they fail. The fifth APE can also take its own physical card where no redundancy is required. APEs preferably auto fail over to the fifth APE, but mannually fail back upon insertion of a new card, allowing service providers greater control over when service interruptions occur.

L3s typically perform 3:2 load sharing. When in one embodiment all three L3s are installed, the forwarding load is balanced across all three L3s. If one L3 fails, the remaining two L3s pick up the balance of the forwarding. L3s auto restore upon insertion of a new card.

In one embodiment, CPRs are typically 1:1 redundant, and auto fail to each other. CPRs typically do not restore upon insertion of a new card, and instead a newly inserted card is secondary until the fail over condition and other network conditions force it to become primary.

FIG. 1 shows a logical block diagram of an embodiment of the disclosed technology. The incoming ports connect the system to a network via channelized DS3 pipes 101. The system can have up to 32 DS3 inputs. Each DS3 line is connected to a Phy card 103 which handles the analog input. The Phy card 103 is directly connected to an access processor engine (APE), also known as a demux card 105, which contains the logic to separate the DS3 data into individual HDLC streams and creates separate packets per channel. The demux card 105 supports up to 128 channels per OC3 equivalent. Each demux card 105 contains logic to support up to six DS3 pipes. There are a total of up to five APEs in the system, four of which support the physical interconnect and the fifth APE for N+1 redundancy. The fifth demux card 107 connects to all of the Phy cards via a bus 111 and can take over for any of the APEs if they fail. The redundant demux card 107 can also take its own Phy card if a user does not care to have the redundancy. In this configuration, the L3 engines will be oversubscribed.

The demux cards 105 are also connected to the L3 engines 113. The L3 engines 113 are responsible for performing the IP forwarding on each packet. Each L3 engine 113 can handle forwarding for twelve DS3 pipes, one trunk card 115 and one CPR card 117. If all three L3 engines 113 are installed in the system, the forwarding load will be balanced across all of them. If one fails, the other two pick up the balance for the forwarding.

There are two trunk cards 115 and two central processing engines (CPR) 117. The trunk cards 115 give access into the internal POP network. Each trunk card 115 supports an OC12 ATM interface. The CPR cards 117 are used as the route determination engine and for control of the system.

To understand which cards a given L3 processor services, it will be noted that there are four shared busses 120–123 instead of single point-to-point connections. This allows the third L3 (L3-3) engine to function the same as the first two L3 two L3 engines (referred to as "L3-1 engine" and "L3-2 engine"). T1 and T2 share the third bus 122, and CPR1 and CPR2 share the fourth bus 123. For L3-3 to look like the L3-1 engine, D1, D2, CPR1 and T1 are enabled onto the shared busses 120–123; for the L3-3 engine to look like the L3-2 engine, D2, D3, CPR2 and T2 are enabled onto the shared busses 120–123. In the case where all three L3 engines are installed, the third L3 engine is used for forwarding in order to reduce the burden on the other two processors. Various L3 failure configurations are shown below in Table 1.

TABLE 1

| | L3 failure configurations. | | | |
|---|---|---|---|---|
| | No Failure | L3-1 Fails | L3-2 Fails | L3-3 Fails |
| L3-1 | D1, T1, CPR1 | | D1, D2, T1, CPR1 | D1, D2, T1, CPR1 |
| L3-2 | D4, T2, CPR2 | D3, D4, T2, CPR2 | | D3, D4, T2, CPR2 |
| L3-3 | D2, D3 | D1, D2, T1, CPR1 | D3, D4, T2, CPR2 | |

Case 1: All three L3s installed, no failures. The forwarding load is distributed across all L3s. D2 and D3 are enabled onto the first bus 120 going to the L3-3 engine.

Case 2: All three L3s installed, the L3-1 engine fails. The L3-2 and L3-3 engines are reconfigured to service different cards. First, D3 is switched from the L3-3 engine back to the L3-2 engine. Next, D1, CPR1 and T1 are enabled onto the shared busses 120, 122 and 123 going to the L3 engine. Note that D3 is switched to L3-2 because it shares the second bus 121 with D1. D1 normally is serviced by the L3-1 engine so it must use the bus 121 to go to the L3-3 engine.

Case 3: All three L3s installed, the L3-2 engine fails. The L3-1 and L3-3 engines are reconfigured to service different cards. First, D2 is switched from the L3-3 engine back to the L3-1 engine. Next, D4, CPR2 and T12 are enabled onto the shared busses going to the L3 engine. Note that D2 is switched to the L3-1 engine because it shares the first bus 120 with D4. D4 normally is serviced by the L3-2 engine so it must use the first bus 120 to go to the L3-3 engine.

Case 4: All three L3s installed, the L3-3 engine fails. The L3-1 and L3-2 engines are reconfigured to service different cards. First, D3 is switched from the L3-3 engine back to the L3-2 engine. Next, D2 is switched from the L3-3 engine back to the L3-1 engine.

Figure 2:
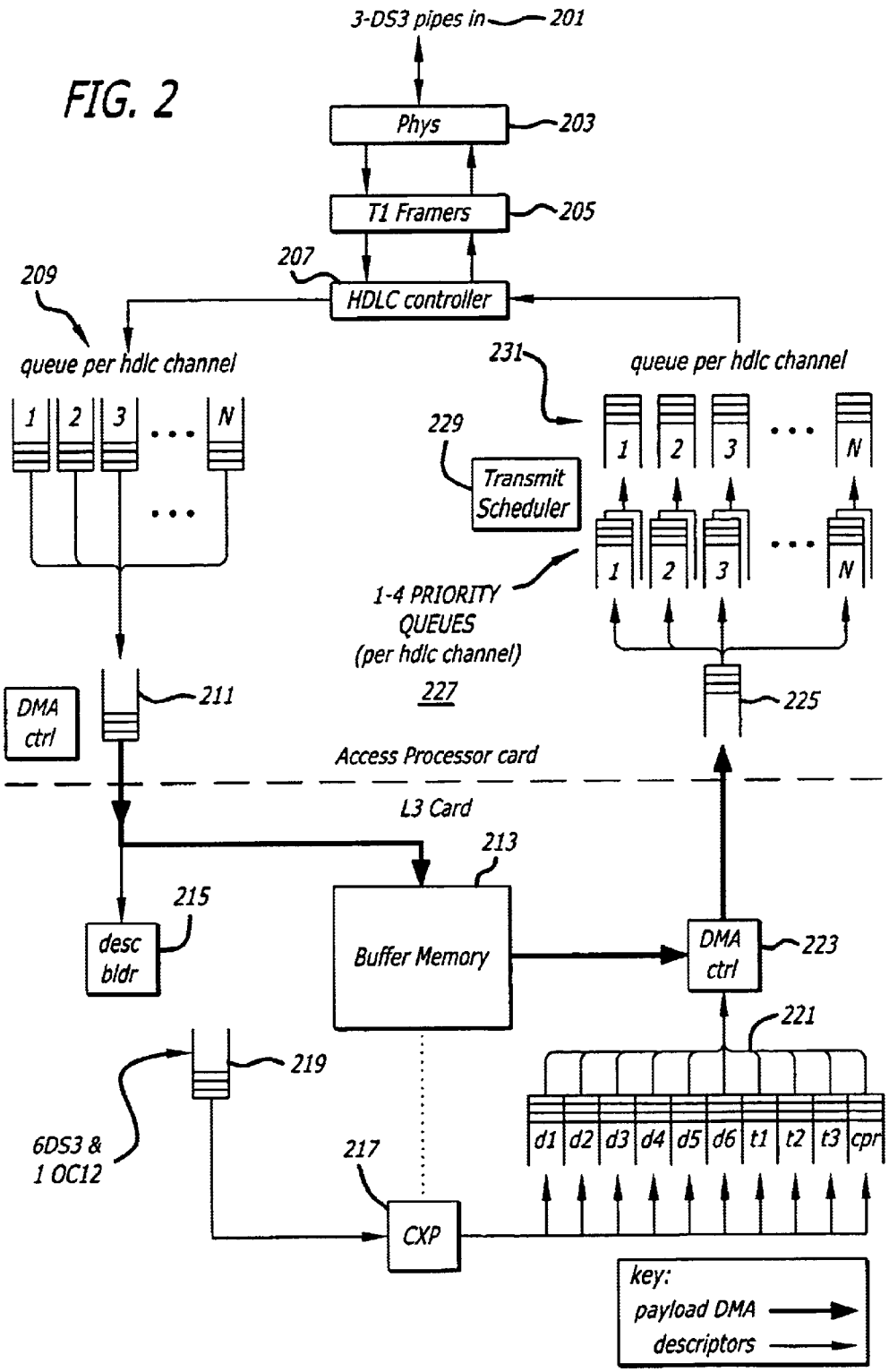
FIG. 2 is a block diagram of a basic hardware forwarding path compatible with the present invention.

In one embodiment of the disclosed technology, basic data packet forwarding is performed as shown in FIG. 2. Data typically is received from one or more DS3 pipes 201 and is relayed through the Phys 203 and the T1 205 framers. The data is then sent to an HDLC controller 207 which, in one embodiment, dechannelizes the data into 128 channels 209. Frames are dequeued from the per-channel HDLC receive (Rx) queues 209 that are filled by the HDLC controller 207. Data frames of the data are queued onto a single queue 211 destined for buffer memory 213 on a L3 forwarding engine card, and the originating channel from the receive queues 209 is tagged onto the frames. The frames are transferred from the single queue 211 to the buffer memory 213, in one embodiment, via a direct memory address (DMA) transfer. A buffer is typically allocated for the DMA transfer from the single queue 211, and the entire frame is transferred into a contiguous buffer in buffer memory 213. A descriptor builder 215 creates a frame descriptor from the channel, the frame length, the buffer index, the IP headers the TCP/UDP ports and the TCP flags. The frame descriptor is then tagged onto the frames.

If the point-to-point protocol (PPP) header of the frame is not the appropriate value for an IP frame, such as an LCP or NCP frame or a non-IP frame, then the CXP 217 is backed when it reads the descriptor of a frame from the descriptor queue 219. Otherwise, the PPP header indicates that the frame is an IP data frame, and the CXP 217 performs fast-path frame processing. If the descriptor is backed, then the CXP 217 will typically forward the frame to the CPR or decide that the PPP header should be examined from the frame in buffer memory.

The CXP 217 writes output descriptors received from the descriptor queue 219 to the output queues 221. The output queues 221 are typically managed in hardware, such as where the CXP 217 writes descriptors to the output queues 221, but the output queues 221 typically do not keep track of any queue insert pointers. The DMA controller 223 acts as a frame reassembly engine to rebuild frames from header information in the output queues 221. Each frame is sent to the appropriate module based on the channel number in the descriptor. The descriptors are shuffled from the single inbound DMA descriptor queue 225 to per-channel priority queues 227, where any required queue clipping takes place. A transmit scheduler 229 drains the per-channel priority queues 227 into the per-channel HSLC transmit (Tx) queues 231, according to the appropriate algorithm.

In one embodiment of the disclosed technology, a processor such as a microprocessor creates a single 32 bit queue selection word for each input channel which acts as a "to do" list. The queue selection words are typically created at an initialization time. Two bits of each 32 bit queue selection word are used to assign a priority to each output data queue, allowing 16 output queues to be represented by each 32 bit queue selection word. In one embodiment of the disclosed technology, the two bit priority value for an output data queue may be assigned as: 00–50%, 01–25%, 10–12.5%, 11–12.5%. It will be recognized by one of ordinary skill in the art that the size of the queue selection word may be increased or decreased, that the number of bits assigned to represent a priority value for an output data queue may be increased or decreased, and the priority percentages represented by the priority value may be changed without loss of compatibility with the disclosed technology.

In one embodiment of the disclosed technology, a system interrupt is generated when a data packet is forwarded into an output data queue. After handling the interrupt, the processor creates an output mask word which associates an output data queue with a queue selection word, which in turn associates a channel and priority level to the output data queue. Alternatively, the processor can monitor the output data queues by another means, such as polling. In any embodiment, the queue selection word is generated once there is data in one or more of the output data queues.

Once a queue selection word has been generated, the system services each data channel based upon the queue selection word until all of the queues for that channel are empty. The system typically rotates through each queue associated with the queue selection word when either a predetermined amount of data, number of bytes, or volume threshold has been exceeded or there is no data left in the channel. After the channels have been serviced, the system performs channel recovery, performs channel maintenance, and generates channel accounting information.

Figure 3:
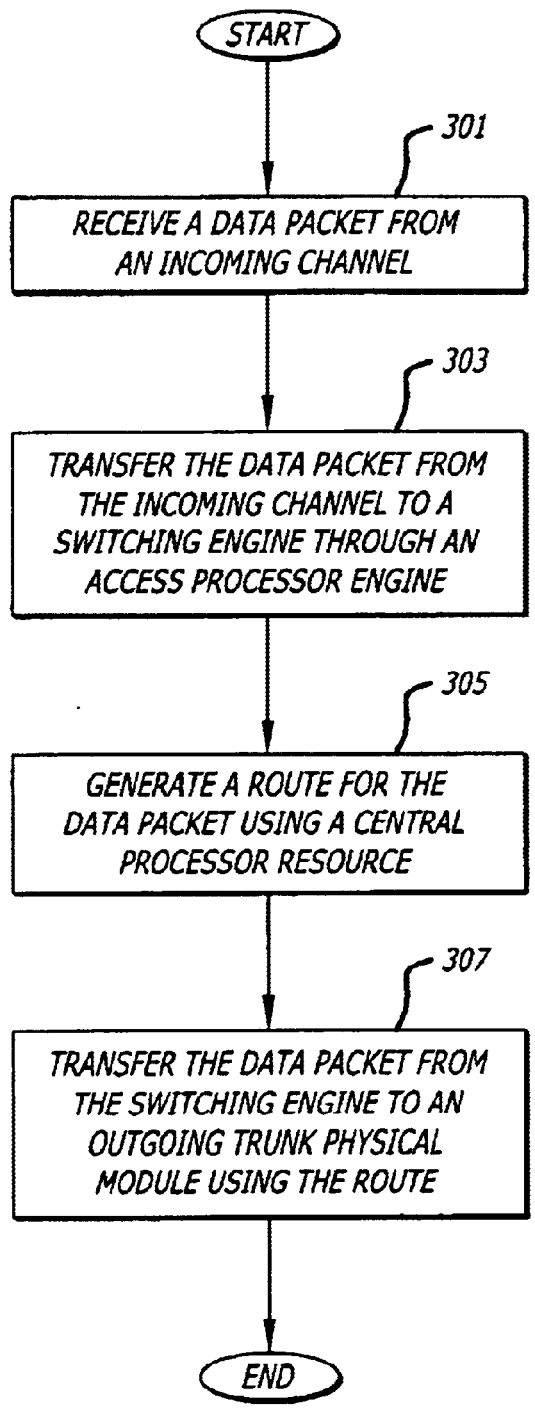
FIG. 3 is a flow chart of a method for routing a data packet with a fault tolerant router architecture compatible with the present invention.

FIG. 3 shows a flow chart of a method for routing a data packet with a fault tolerant router architecture. At step 301, A data packet is received from an incoming data channel. At step 303, the data packet is transferred from the incoming data channel to a switching engine through an access processor engine. At step 305, a route for the data packet is generated using a central processor resource. At step 307, the data packet is transferred from the switching engine to an outgoing trunk physical module using the route.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. An apparatus for a fault tolerant router comprising:

an incoming data channel;

a plurality of access processor engines (APEs) logically coupled to the incoming data channel;

at least one switching engine logically coupled to the plurality of APEs, the at least one switching engine comprises (i) a first switching engine (SE) logically coupled to a first APE and a second APE of the plurality of APEs, and (ii) a second SE logically coupled to a third APE and a fourth APE;

a central processor resource (CPR) logically coupled to the at least one switching engine;

an outgoing trunk physical module (TP) logically coupled to the at least one switching engine.

2. The apparatus of claim 1 wherein the incoming data channel comprises first, second, third and fourth incoming data channels.

3. The apparatus of claim 2 wherein the plurality of APEs further comprises a fifth APE logically coupled to the first, second, third and fourth incoming data channels.

4. An apparatus for a fault tolerant router comprising:

an incoming data channel;

a plurality of access processor engines (APEs) logically coupled to the incoming data channel;

at least one switching engine logically coupled to the plurality of APEs, the at least one switching engine comprises (i) a first switching engine (SE) logically coupled to a first APE and a second APE of the plurality of APEs, and (ii) a second SE logically coupled to a third APE and a fourth APE, and (iii) a third SE logically coupled to the first, second, third and fourth APEs;

a central processor resource (CPR) logically coupled to the at least one switching engine; and an outgoing trunk physical module (TP) logically coupled to the at least one switching engine.

5. The apparatus of claim 4 wherein the CPR comprises a first CPR logically coupled to the first SE and the third SE, and a second CPR logically coupled to the second SE and the third SE.

6. The apparatus of claim 4 wherein the outgoing TP comprises a first TP logically coupled to the first SE and the third SE, and a second TP logically coupled to the second SE and the third SE.

7. An apparatus for a fault tolerant router comprising:

a plurality of access processor engines (APEs), each APE comprises logic that separates incoming data into individual High Level Data Link Control (HDLC) streams and create separate packets per channel;

a first switching engine (SE) logically coupled to a first APE and a second APE of the plurality of APEs, a second SE logically coupled to a third APE and a fourth APE of the plurality of APEs; and a first central processor resource (CPR) logically coupled to the first SE.

8. The apparatus of claim 7 further comprising a first outgoing trunk physical module logically coupled to the first SE.

9. The apparatus of claim 7 further comprising a second CPR logically coupled to the first SE.

10. The apparatus of claim 9 further comprising a second outgoing trunk physical module logically coupled to the first SE.

11. The apparatus of claim 7 further comprising a second CPR logically coupled to the first SE.

12. The apparatus of claim 7 wherein the incoming data is Digital Signal 3 (DS3) data.

13. The apparatus of claim 7 further comprising a Physical (PHY) card coupled to receive incoming data in analog form and to route data in a digital form to the plurality of APEs.

* * * * *